US012692975B2

(12) United States Patent　(10) Patent No.: US 12,692,975 B2
Luo et al.　(45) Date of Patent: Jul. 28, 2026

(54) SHOCK ABSORPTION MECHANISM, SHOCK ABSORPTION REGULATING METHOD, AND SHOCK ABSORPTION CONTROL METHOD

(71) Applicant: TILTA INC., Burbank, CA (US)

(72) Inventors: Yaolong Luo, Shenzhen (CN); Yiling Wang, Shenzhen (CN); Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 77 days.

(21) Appl. No.: 18/662,885

(22) Filed: May 13, 2024

(65) Prior Publication Data

US 2025/0102106 A1　Mar. 27, 2025

(30) Foreign Application Priority Data

Sep. 21, 2023　(CN) .......................... 202311229303.6

(51) Int. Cl.
*F16M 13/02*　(2006.01)
*F16F 15/03*　(2006.01)
*G03B 17/56*　(2021.01)

(52) U.S. Cl.
CPC ............. *F16M 13/02* (2013.01); *F16F 15/03* (2013.01); *G03B 17/561* (2013.01); *F16F 2228/066* (2013.01); *F16F 2230/18* (2013.01)

(58) Field of Classification Search
CPC .... G03B 17/561; H02P 23/0004; F16M 13/02
(Continued)

(56) References Cited

U.S. PATENT DOCUMENTS 4,522,304 A * 6/1985 Dean ..................... F16F 3/0876
206/521
5,710,945 A * 1/1998 Thompson ............. B64D 47/08
396/7
(Continued)

FOREIGN PATENT DOCUMENTS

CN　　204056311 U　12/2014
CN　　207999597 U　10/2018
(Continued)

*Primary Examiner* — Monica E Millner
(74) *Attorney, Agent, or Firm* — LOZA & LOZA, LLP; Derek W. Yeung

(57) ABSTRACT

The present disclosure introduces a shock absorption mechanism, regulating method, and control method, particularly applicable to shock absorption technology for devices like in-vehicle filming equipment. The system comprises connectors, shock absorption components, and supporting components. The connectors exhibit movable connections with the shock absorption components, while the supporting components establish drivable connections with the shock absorption components. Additionally, the connectors are also movably linked to the supporting components. A notable feature of this invention, distinct from existing technologies, is the shock absorption components' capacity to induce front-back or left-right oscillations in the supporting components through their inherent rotation when detecting a tendency for swinging. This proactive response effectively mitigates the centrifugal force resulting from camera swinging, preventing detachment between the camera and the shock absorption arm and averting camera jitter. Consequently, the stability of the recorded footage is assured.

9 Claims, 7 Drawing Sheets

(58) Field of Classification Search
USPC ........................................................ 248/636
See application file for complete search history.

(56)                        References Cited

U.S. PATENT DOCUMENTS

| | | | | |
|---|---|---|---|---|
| 6,513,769 | B1 * | 2/2003 | Chapman ............. | F16F 15/073 |
| | | | | 248/125.1 |
| 6,579,016 | B2 * | 6/2003 | Chapman ............... | F16M 11/18 |
| | | | | 396/428 |
| 7,264,212 | B2 * | 9/2007 | Hung ..................... | F16M 11/10 |
| | | | | D14/452 |
| 7,303,341 | B2 * | 12/2007 | Itzkowitz ............. | G03B 17/561 |
| | | | | 396/428 |
| 7,663,040 | B1 * | 2/2010 | Hsieh ................... | G10D 13/063 |
| | | | | 84/421 |
| 8,226,053 | B2 * | 7/2012 | Yu .......................... | H04R 1/021 |
| | | | | 248/447 |
| 9,208,761 | B2 * | 12/2015 | Miyajima .............. | G10D 13/28 |
| 9,299,328 | B2 * | 3/2016 | Steinhauser ......... | G10D 13/063 |
| 2004/0251389 | A1 * | 12/2004 | Oddsen, Jr. ........... | F16M 11/24 |
| | | | | 248/279.1 |
| 2006/0269278 | A1 * | 11/2006 | Kenoyer ................ | F16M 13/02 |
| | | | | 396/428 |
| 2007/0160364 | A1 * | 7/2007 | Peika ..................... | F16M 13/02 |
| | | | | 396/428 |
| 2012/0081670 | A1 * | 4/2012 | Greaves ................. | F16M 13/04 |
| | | | | 248/371 |
| 2012/0263445 | A1 * | 10/2012 | Beasley ................. | F16M 13/02 |
| | | | | 396/428 |
| 2023/0095802 | A1 * | 3/2023 | Hwang ................ | F16M 11/046 |
| | | | | 248/543 |
| 2024/0064403 | A1 * | 2/2024 | Wang ..................... | H04N 23/51 |

FOREIGN PATENT DOCUMENTS

| | | | | |
|---|---|---|---|---|
| CN | 113048189 | A | 6/2021 | |
| WO | WO-2021253287 | A1 * | 12/2021 | ............. B64U 50/19 |

* cited by examiner

Receiving a parameter slated for modification      S11

Exerting control over the shock absorption of the shock absorption component's rotation based on the parameter      S12

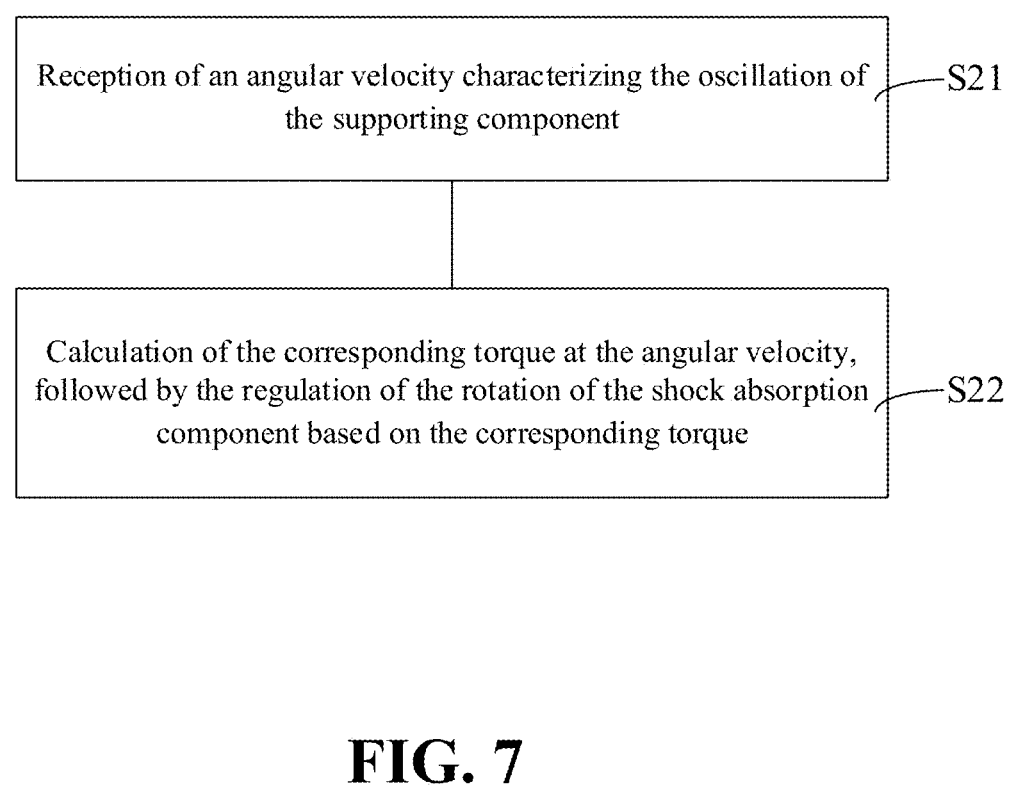

Reception of an angular velocity characterizing the oscillation of the supporting component ⎯S21

Calculation of the corresponding torque at the angular velocity, followed by the regulation of the rotation of the shock absorption component based on the corresponding torque ⎯S22

FIG. 7

SHOCK ABSORPTION MECHANISM, SHOCK ABSORPTION REGULATING METHOD, AND SHOCK ABSORPTION CONTROL METHOD

CROSS-REFERENCE TO RELATED APPLICATIONS

The present application for patent claims priority to and the benefit of pending Chinese Application No. 2023112293036, filed Sep. 21, 2023, and hereby expressly incorporated by reference herein as if fully set forth below in its entirety and for all applicable purposes.

TECHNICAL FIELD

The present disclosure belongs to the field of shock absorption for devices like in-vehicle filming equipment, in particular to a shock absorption mechanism, regulating method, and control method.

INTRODUCTION

In the realm of capturing dynamic scenes with vehicle-mounted filming devices, whether in indoor or outdoor settings, the utilization of auxiliary tools such as vehicle-mounted camera support structures is commonplace. These structures, employed for filming moving vehicles or similar scenarios, secure the camera to the vehicle, ensuring precise synchronization with the filming scene. Nevertheless, the variable conditions of the road surface can introduce vibration and disturbance to both the camera and the vehicle-mounted support structure, resulting in undesired motion-induced camera shake during filming. To address this challenge and ensure stable footage, shock absorption mechanisms, exemplified by shock absorption arms, are typically integrated into camera installations. Conventional shock absorption arms typically feature shock-absorbing springs affixed to the main body of the shock absorption arm. The head of the shock absorption arm is linked to camera connectors, which securely fasten the camera. The overall structure undergoes buffering and damping through the utilization of these shock-absorbing springs.

As described in the prior patent application of a shock absorption head, vehicle-mounted shock absorption arm, and vehicle-mounted filming device bearing the application number CN202110273411.8, the shock absorption head comprises an external structure, a buffering component, and a connector. The buffering component incorporates at least one first slider and a second slider, both arranged in parallel with a vertical orientation. Each slider is equipped with two elastic components. The external structure smoothly slides onto the second slider, clamping between the two elastic components of the second slider. The second slider then seamlessly slides onto the first slider, clamping between the two elastic components of the first slider. The connector is rigidly affixed to the buffering component and serves for the attachment of external photographic accessories. In this patent, the elastic components are realized through springs. As the gimbal moves along the direction parallel to the first slider or the second slider, the springs undergo compression or extension, effectively slowing down the lateral or longitudinal movements of the camera mounted on the gimbal, thereby achieving effective shock absorption.

However, it is discernible from the aforementioned description that the existing shock absorption arm structure, relying on shock-absorbing springs, faces challenges during the filming process, especially concerning camera shaking and lateral inertia. These challenges pose difficulties in maintaining precise control over the camera's stability and preventing detachment at the head of the shock absorption arm.

BRIEF SUMMARY

To address the aforementioned challenges, an objective of the present disclosure is to introduce a shock absorption mechanism, a shock absorption regulating method, and a shock absorption control method meticulously designed to mitigate the centrifugal force induced by the swinging tendency of the supporting component. This is accomplished through the autonomous rotation and actuation of the supporting component, facilitating controlled oscillations in both lateral and longitudinal directions, thereby preventing detachment between the camera and the shock absorption arm. Furthermore, the invention aims to eradicate camera jitter and ensure the utmost stability in the captured footage.

To achieve the above objective, the technical solution of the present disclosure is as follows:

A shock absorption mechanism, comprising:

a connector;

a supporting component, with movable connection to the connector;

a shock absorption component, with a first end rotationally connected to the connector and a second end movably connected to the supporting component for facilitating the supporting movement.

Within this application, the supporting component serves as the platform for devices requiring shock-absorbing, such as cameras, while the connector is instrumental in linking structures like gimbals. The shock absorption component, endowed with the capability to induce controlled oscillations, plays a pivotal role in providing rotational buffering and shock absorption functions. During the filming process, when the camera manifests horizontal jitter and inertial movement, leading to a swinging tendency, the supporting component reacts by swaying in response to the camera's influence. Simultaneously, the shock absorption component discerns this swinging tendency, triggering autonomous rotation based on the detection result. It subsequently propels the supporting component and the camera to oscillate back and forth or left and right in alignment with the connector. This orchestrated movement effectively buffers the centrifugal force generated by the camera's swinging, averting detachment between the camera and the shock absorption arm, camera jitter, and thereby ensuring the unwavering stability of the captured footage.

Furthermore, the connector consist of a connecting body featuring a plurality of connecting arms, and the plurality of connecting body are individually and movably connected to corresponding a plurality of shock absorption components.

Furthermore, a movable axle is positioned between two connecting arms. The movable axle establishes rotational connections with the two connecting arms and is movably linked to the supporting component. In this application, the shock absorption component is equipped with multiple sets strategically positioned on both the left and right sides of the first connecting part. These sets possess the capacity to freely mobilize the supporting component through their rotational motion. As the shock absorption components rotate backward, they generate tension, while forward rotation provides thrust. When the shock absorption components on both sides rotate at identical speeds and in the same direction, they collaboratively induce controlled oscillations in the supporting component, effectively buffering the centrifugal force resulting from the camera's forward and backward movement. Conversely, when the shock absorption components on both sides rotate at identical speeds but in opposite directions, they cooperatively drive the supporting component to flip, thereby buffering the flipping centrifugal force stemming from the camera's shake. The synchronization of varying tension or thrust in these scenarios ensures lateral oscillation of the supporting component, effectively buffering the camera's arbitrary-angle swinging and upholding the stability of the camera's captured footage.

Furthermore, the shock absorption component comprises shock absorption member and a transmission member; the shock absorption member movably connected to the connecting arm and the shock absorption member drivably connect to the transmission member; an end of the transmission member away from the shock absorption member being movably connected to the supporting component, which transmits the movement of the shock absorption member to the supporting component.

Furthermore, the shock absorption member feature a rotating part and a fixed part. the fixed part being connected to the connecting arms and the fixed part are movably connected to the rotating part, so that the rotating part is rotationally connected to the connecting arms. the rotating part are movably connected to the transmission member, propelling the motion of the transmission member as the rotating part rotate.

Furthermore, the shock absorption mechanism additionally encompasses a plurality of transmission shafts. two of the plurality of transmission shafts are individually movably connected to two ends of the transmission member, and the two the plurality of transmission shafts are movably connected both the shock absorption member and the supporting component, which the two ends of the transmission member are respectively connected to and the shock absorption member and the supporting component.

Furthermore, a first drive shaft seat being configured at an outer periphery of the shock absorption member, the supporting component is equipped with a second drive shaft seat; the two ends of the transmission member are respectively connected to the first drive shaft seat and the second drive shaft seat.

Furthermore, the movable axle comprises a first axle part and a second axle part, and the supporting component features a supporting articulation seat. The first axle part is rotationally connected between the two connecting arms, while the second axle part is rotationally connected to the supporting articulation seat. This meticulous arrangement facilitates the movable connection of the connecting arms to the supporting component.

Furthermore, the second drive shaft seat comprises multiple units, with two units situated at both ends of the supporting component. The supporting articulation seat is strategically positioned along the midpoint between the two second drive shaft seats, establishing an articulated connection with the connecting arm. Within this application, the lower end of the first connecting portion establishes a movable connection to the supporting component through the movable axle. This operational feature enables relative movement between the supporting component and the second connecting portion under the impetus of the rotating component, thereby achieving effective buffering. Notably, the placement of the movable axle above the supporting component minimizes the impact of tension and thrust generated during the movement of the connector on the supporting component. This design consideration ensures structural stability and eliminates interference during the movement or rotation of the connector.

Furthermore, the fixed part's central region is fitted with a through-hole, while the rotating part boasts a protrusion. The protrusion is seamlessly inserted into the through-hole of the fixed part, establishing a pivotal connection. Additionally, the rotating part incorporates a bearing, and the shaft is rotationally linked to the fixed part through this bearing.

Furthermore, the rotating part includes a magnetic encoder and an encoding magnet. The fixed part is rigidly affixed with a coil, and internally, the rotating part houses a magnet aligning with the coil. The magnet encompasses the outer perimeter of the coil. Positioned on one side of the fixed part, the magnetic encoder collaborates with the encoding magnet, which is rigidly affixed with the rotating part, and on the side distanced from the rotating part, the fixed part is equipped with an anti-detachment device. The encoding magnet is securely embedded within the anti-detachment device, with the device rigidly connected to the shaft. This application leverages the principles of a brushless motor, wherein the coil and magnet cooperation, driven by electromagnetic inductive, instigates the rotation of the rotating part, effecting movement in the supporting component relative to the first connecting part. This dynamic interaction efficiently buffers the inherent shaking tendency of the supporting component, providing a discernible shock absorption effect. Furthermore, during operation, if the camera-induced shake causes the supporting component to deviate, the supporting component imparts a deviation trend to the rotating part. In such instances, the magnetic encoder detects the shaking angular velocity of the rotating part through the encoding magnet, transmitting this information to the microcontroller. The microcontroller, employing a PID algorithm, computes the voltage corresponding to the torque generated by the motor, subsequently directing the coil to generate the requisite torque based on this voltage. This orchestrated action propels the rotating part, mitigating the camera shake. To ensure synchronous rotation, the anti-detachment device, affixed by screws to the left end of the shaft, prevents the encoding magnet from detaching, thereby allowing the magnetic encoder to accurately monitor the rotating angular velocity of the rotating part.

Furthermore, the rotating part is furnished with a shaft, and bearings are positioned on both sides of the rotating part. The shaft is rotationally connected to the fixed part and the connecting arm through their respective bearings. This configuration allows the shaft to rotate relative to the fixed part and the connecting arm, thereby augmenting the overall stability of the structure.

Furthermore, the outer side of the end part of the connecting arm features an installation groove precisely matching the contour of the rotating part. Within this installation groove, the rotating part is positioned in a limited manner.

Furthermore, both the movable axle and the lower transmission shaft are engineered as cross-axis shafts, endowing them with the capacity for both front-back and left-right rotation. This characteristic facilitates flexible transmission functions within the structure.

Furthermore, the connecting arm is designed in a triangular structure, offering a more even distribution of the camera's weight and imparting enhanced stability to the overall structure.

The present disclosure also introduces a shock absorption regulating method, applicable to the aforementioned shock absorption mechanism, wherein:

Receiving a parameter slated for modification;

Exerting control over the shock absorption of the shock absorption component's rotation based on the received parameters.

The parameter under consideration is voltage.

Furthermore, the present disclosure expounds upon a shock absorption regulating method, applicable to the disclosed shock absorption mechanism, involving the following steps:

Reception of the angular velocity characterizing the oscillation of the supporting component;

Calculation of the corresponding torque at the provided angular velocity, followed by driving the rotation of the rotating component with the corresponding torque generated by controlling the shock absorption component according to the computed torque.

Furthermore, utilizing the PID algorithm to calculate the voltage value.

Furthermore, in this application, the rotating component operates on the principles of a brushless motor. Voltage serves as a parameter, and through meticulous adjustment of the voltage, the magnetic force between the coil and the magnet undergoes modulation. This deliberate modulation effectuates shock absorption adjustments within the shock absorption mechanism, mitigating the camera's shake in a real-time manner.

A notable feature of this disclosure, distinct from existing technologies, is the shock absorption components' capacity to induce front-back or left-right oscillations in the supporting components through their inherent rotation when detecting a tendency for swinging. This proactive response effectively mitigates the centrifugal force resulting from camera swinging, preventing detachment between the camera and the shock absorption arm and averting camera jitter. Consequently, the stability of the recorded footage is assured.

BRIEF DESCRIPTION OF THE DRAWINGS

FIG. 7 is a flowchart of a shock absorption control method according to one embodiment of the present disclosure.

NUMBERING EXPLANATION

Figure 1:
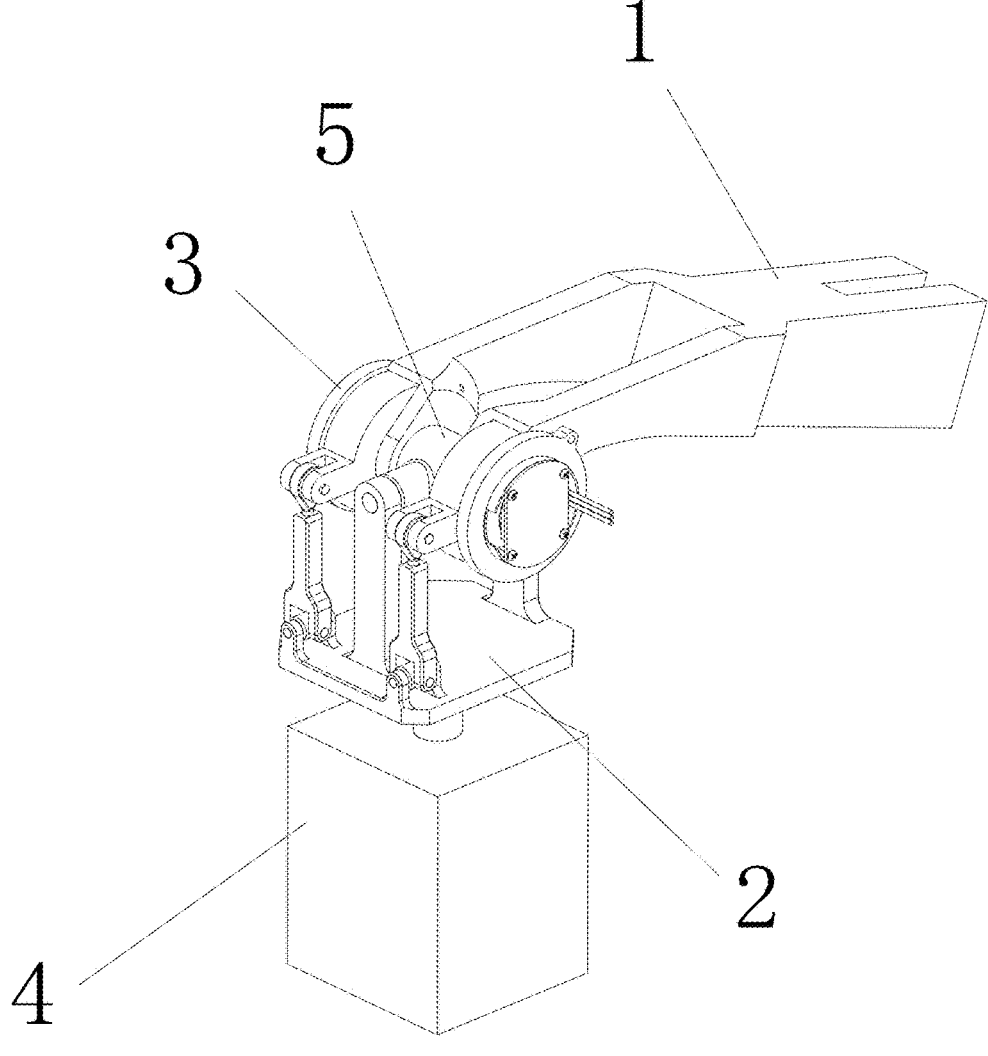
FIG. 1 is an axonometric view of a shock absorption mechanism according to one embodiment of the present disclosure.

Connector 1, Connecting body 11, First connecting arm 12, Second connecting arm 13, Installation groove 14.

Supporting component 2, First lower transmission shaft seat 21, Second lower transmission shaft seat 22, Supporting hinge seat 23.

Shock absorption component 3, First shock absorption component 31, First rotating component 311, First rotating part 3111, First fixed part 3112, First magnetic encoder 3112, First encoding magnet 3114, First coil 3114, First magnet 3116, First upper transmission shaft seat 3117, First shaft 3118, First anti-detachment device 3119, First transmission component 312, First upper transmission shaft 3121, First transmission bar 3122, First lower transmission shaft 3123. Second shock absorption component 32, Second rotating component 321, Second rotating part 3211, Second fixed part 3212, Second magnetic encoder 3213, Second encoding magnet 3214, Second coil 3215, Second magnet 3216, Second upper transmission shaft seat 3217, Second shaft 3218, Second anti-detachment device 3219, Second transmission component 322, Second upper transmission shaft 3221, Second transmission bar 3222, Second lower transmission shaft 3223.

Camera 4.

Movable axle 5.

DETAILED DESCRIPTION

To elucidate the purpose, technical solution, and aspects of the present disclosure, a detailed description is presented in conjunction with the accompanying drawings and embodiments. It is important to note that the specific embodiments outlined herein are intended solely for explanatory purposes and do not serve to limit the scope of the present disclosure.

In an embodiment, referencing FIGS. 1-5, a shock absorption mechanism, includes:

a connector 1; a supporting component 2 configured to establish a movable connection with the connector 1; a shock absorption component 3, with one end (a first end) of the shock absorption component 3 rotatably linked to the connector 1, and the other end (a second end) connected to the supporting component 2 for transmission, facilitating the propulsion or movement of the supporting component 2's movement.

In this embodiment, the supporting component 2 serves as the platform for a camera 4, while the connector 1 is used for connecting to structures like gimbals. The shock absorption component 3, endowed with the capability to induce controlled oscillations of the supporting component 2, plays a pivotal role in providing rotational buffering (e.g., damping) and shock absorption functions. During the filming process, when the camera manifests horizontal jitter and inertial movement, leading to a swinging tendency, the supporting component 2 reacts by swaying in response to the camera's influence. Simultaneously, the shock absorption component 3 discerns or detects this swinging tendency of the supporting component 2, triggering autonomous rotation based on the detection result. It subsequently propels the supporting component 2 and the camera to oscillate back and forth or left and right in alignment with the corresponding directions. This orchestrated movement effectively buffers the centrifugal force generated by the camera 4's swinging or movement, averting camera 4's jitter, and thereby ensuring the unwavering stability of the captured footage. In some examples, the supporting component 2 may encompass various forms such as a supporting plate, supporting block, or supporting pillar.

Figure 2:
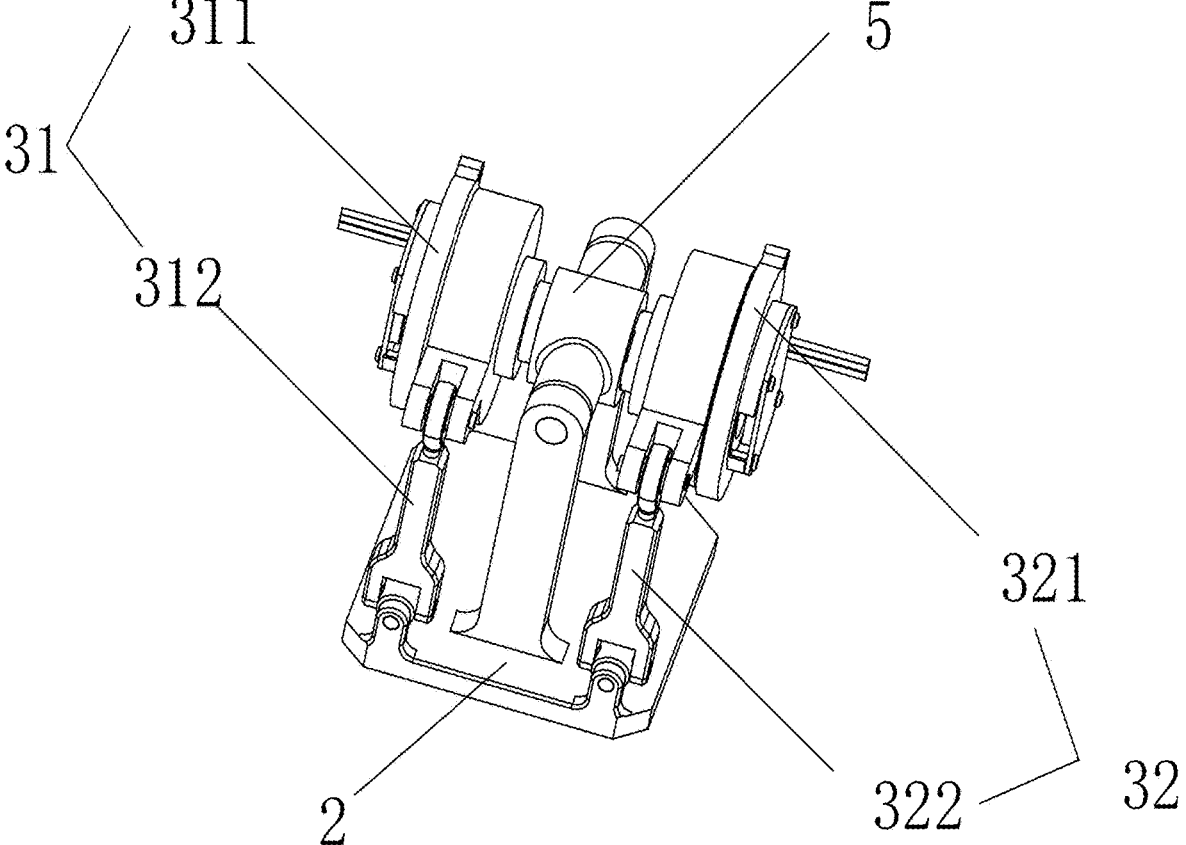
FIG. 2 is a structural schematic diagram of the assembled state of a supporting component, a shock absorption component, and a movable axle in one embodiment.
Figure 3:
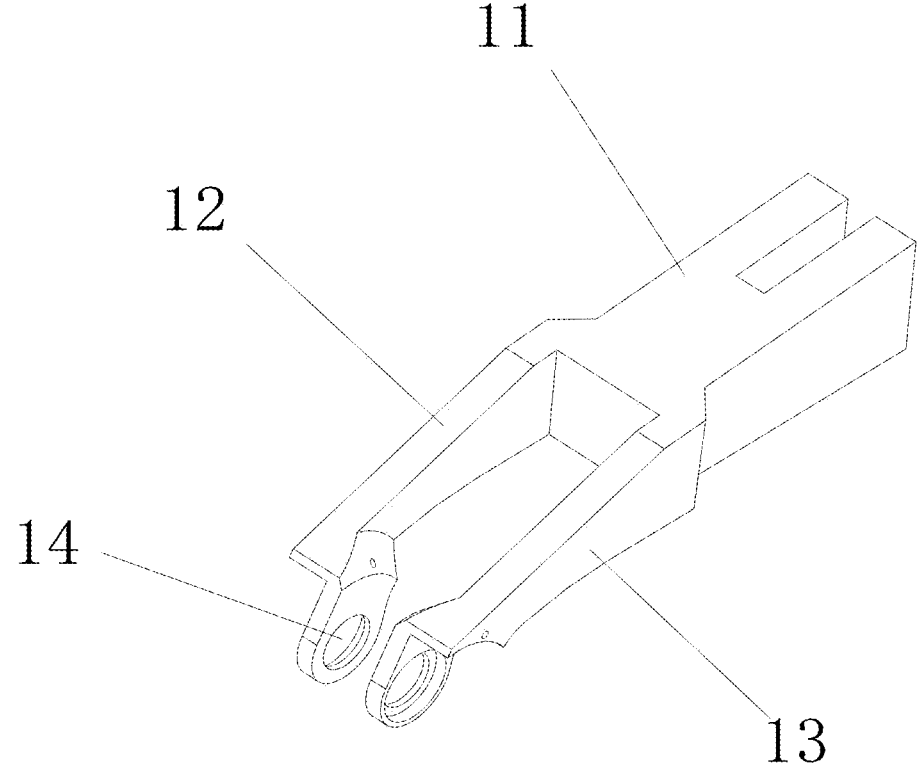
FIG. 3 is a structural schematic diagram of a connector in one embodiment.

Furthermore, referring to FIG. 3, the connector I encompasses a connecting body 11, where at one end of the connecting body 11, a first connecting arm 12 and a second connecting arm 13 are rigidly affixed. Referring to FIG. 2, the shock absorption component 3 includes a first shock absorption component 31 and a second shock absorption component 32 (The shock absorption mechanism herein can include a plurality of shock absorption components 3, for example, two of which is the first shock absorption component 31 and the second shock absorption component 32), strategically positioned on the left and right sides of the connecting body 11, respectively. The upper end of the first shock absorption component 31 establishes a movable connection with the first connecting arm 12, while the lower end is linked to the supporting component 2 for transmission. Similarly, the upper end of the second shock absorption component 32 is movably connected to the second connecting arm 13, and the lower end is connected to the supporting component 2 for transmission. In this embodiment, the first shock absorption component 31 and the second shock absorption component 32 are respectively positioned on the left and right sides of the connecting body 11. These sets possess the capacity to freely mobilize the supporting component 2 through their rotational motion. As the shock absorption components 31 and 32 rotate backward, they generate tension, while forward rotation provides thrust. When the rotation speeds and directions of the first and second shock absorption components are synchronized, they jointly propel the supporting component 2 to oscillate back and forth, effectively buffering the centrifugal force resulting from the forward and backward movements of the camera 4. Conversely, when their rotation speeds are consistent (similar) but the directions are opposite, they collaboratively induce left and right swinging of the supporting component 2, mitigating the flipping centrifugal force stemming from the camera 4's shake. This mechanism employs varying tensions or thrusts between the two components to achieve automatic spatial movement of the supporting component 2, adeptly buffering (e.g., damping) the camera 4's shake at any angle, thereby ensuring the stability of the camera 4 during filming.

Figure 4:
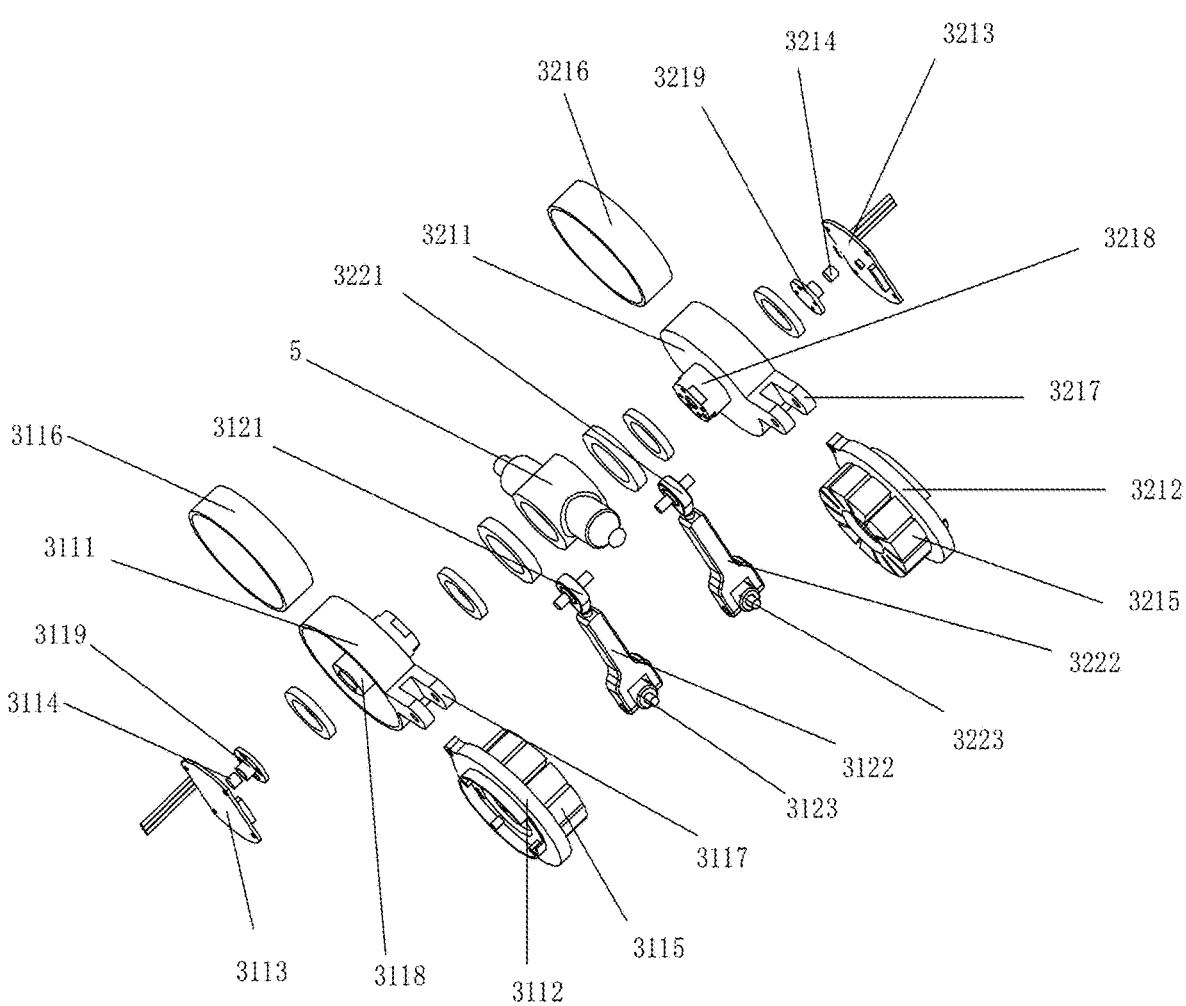
FIG. 4 is an exploded view of the shock absorption component in one embodiment.

In some aspects, the first shock absorption component 31 includes a first rotating component 311 and a first transmission component 312. Referring to FIG. 4, the first rotating component 311 is composed of a first rotating part 3111, a first fixed part 3112, a first magnetic encoder 3113, and a first encoding magnet 3114. The first fixed part 3112 is securely connected to the first connecting arm 12 (see FIG. 3) and rotationally linked to the first rotating part 3111. The first rotating part 3111 houses a first magnet 3116, which is correspondingly matched with and encircles outside a first coil 3115, fixed on the first fixed part 3112. Positioned on one side of the first fixed part 3112, the first magnetic encoder 3113 cooperates with the first encoding magnet 3114, which is securely connected to the first rotating part 3111. The outer side of the first rotating part 3111 is also equipped with a first upper transmission shaft seat 3117 (e.g., a first transmission shaft seat comprises a first upper transmission shaft seat 3117 and a second upper transmission seat 3217), directly below which the supporting component 2 (see FIG. 5) is located, featuring a first lower transmission shaft seat 21 (e.g., a second transmission shaft seat comprises a lower transmission shaft seat 21 and a second lower transmission shaft seat 22). The first transmission component 312 (first transmission member) includes a first upper transmission shaft 3121, a first transmission bar 3122, and a first lower transmission shaft 3123. The first upper transmission shaft 3121 is rotatably connected to the first upper transmission shaft seat 3117 and rigidly connected to the upper end of the first transmission bar 3122. The first lower transmission shaft 3123 is rotatably connected to the lower end of the first transmission bar 3122 and the first lower transmission shaft seat 21 (see FIG. 5). In this embodiment, leveraging the principles of a brushless motor, the cooperation between the first coil 3115 and the first magnet 3116, driven by electromagnetic inductive, instigates the rotation of the first rotating part 3111, effecting movement in the supporting component 2 (see FIG. 1) relative to the first connecting arm 12 (see FIG. 3) via the first transmission component. This dynamic interaction efficiently buffers the inherent shaking tendency of the supporting component 2, providing a discernible shock absorption effect. Additionally, during operation, if the camera-induced shake causes the supporting component 2 to deviate, the supporting component 2 imparts a deviation trend to the rotating component. In such instances, the magnetic encoder 3113 detects the shaking angular velocity of the first rotating part 3111 through the first encoding magnet 3114, transmitting this information to a microcontroller. The microcontroller, employing a PID algorithm, computes the voltage corresponding to the torque generated by the motor, subsequently directing the coil to generate the requisite torque based on this voltage. This orchestrated action propels the rotating component, mitigating the camera 4's shake.

Furthermore, the first rotating part 3111 incorporates a first shaft 3118, housing bearings on its left and right sides. The first shaft 3118 is rotationally connected to the first fixed part 3112 and the first connecting arm 12 through these bearings, affording the first shaft 3118 the capability to rotate relative to the first fixed part 3112 and the first connecting arm 12.

Additionally, on the side of the first fixed part 3112 facing away from the first rotating part 3111, a first anti-detachment device 3119 is positioned, with the first encoding magnet 3114 securely fixed within it. The first anti-detachment device 3119 is firmly connected to the first shaft 3118, for example, attached to the left end of the first shaft 3118 with screws. This configuration prevents any detachment of the first encoding magnet 3114 from the first shaft 3118, ensuring synchronous rotation and allowing the first magnetic encoder 3113 to accurately monitor the rotational angular velocity of the first rotating part 3111.

Furthermore, referring to FIG. 2, the second shock absorption component 32 includes a second rotating component 321 and a second transmission component 322 (second transmission member). Referring to FIG. 4, the second rotating component 321 encompasses a second rotating part 3211, a second fixed part 3212, a second magnetic encoder 3213, and a second encoding magnet 3214. The second fixed part 3212 is rigidly connected to the second connecting arm 13 (see FIG. 3) and rotationally linked to the second rotating part 3211. The second rotating part 3211 houses the second magnet 3216, which is correspondingly matched with and encircles outside the second coil 3215, which is fixed on the second fixed part 3212. Positioned on one side of the second fixed component 3212, the second magnetic encoder 3213 cooperates with the second encoding magnet 3214, which is securely connected to the second rotating part 3211. The outer side of the second rotating part 3211 is also equipped with a second upper transmission shaft seat 3217, directly below which the supporting component 2 is located, featuring the second lower transmission shaft seat 22 (see FIG. 5). The second transmission component 322 includes a second upper transmission shaft 3221, a second transmission bar 3222, and a second lower transmission shaft 3223. The second upper transmission shaft 3221 is rotatably connected and fixed to the second upper transmission shaft seat 3217 and firmly attached to the upper end of the second transmission bar 3222. The second lower transmission shaft 3223 is rotatably connected to the lower end of the second transmission bar 3222 and the second lower transmission shaft seat 22 (see FIG. 5). In this embodiment, leveraging the principles of a brushless motor, the cooperation between the second coil 3215 and the second magnet 3216, driven by electromagnetic inductive, instigates the rotation of the second rotating part 3211, effecting movement in the supporting component 2 relative to the second connecting arm 12 via the second transmission component 322. This dynamic interaction efficiently buffers the inherent shaking tendency of the supporting component 2, providing a discernible shock absorption effect. The upper and lower ends of the transmission bar are both of movable connections, which provide a high degree of flexibility and make it easier to adjust the support component 2. Additionally, during operation, if the camera-induced shake causes the supporting component 2 to deviate, the supporting component 2 imparts a deviation trend to the rotating component. In such instances, the magnetic encoder 3213 detects the shaking angular velocity of the second rotating part 3211 through the second encoding magnet 3214, transmitting this information to the microcontroller. The microcontroller, employing a PID algorithm, computes the voltage corresponding to the torque generated by the motor, subsequently directing the coil to generate the requisite torque based on this voltage. This orchestrated action propels the rotating component, mitigating the camera 4's shake.

Additionally, the second rotating part 3211 incorporates the second shaft 3218, with bearings situated on its left and right sides. The second shaft 3218 is rotationally connected to the second fixed part 3212 and the second connecting arm 13 through these bearings, allowing the second shaft 3218 to rotate relative to the second fixed part 3212 and the second connecting arm 13, thereby enhancing the overall stability of the structure.

Furthermore, the second fixed part 3212 is equipped with a second anti-detachment device 3219 on the side opposite the second rotating part 3211. The second encoding magnet 3214 is securely positioned within the second anti-detachment device 3219, and the second anti-detachment device 3219 is firmly connected to the second shaft 3218. By fastening the second anti-detachment device 3219 to the left end of the second shaft 3218, for example, using screws, any unintended detachment of the second encoding magnet 3214 from the second shaft 3218 is prevented. This design ensures the synchronous rotation of the second encoding magnet 3214 with the second shaft 3218, enabling the second magnetic encoder 3213 to accurately monitor the rotational angular velocity of the second rotating part 3211.

Figure 5:
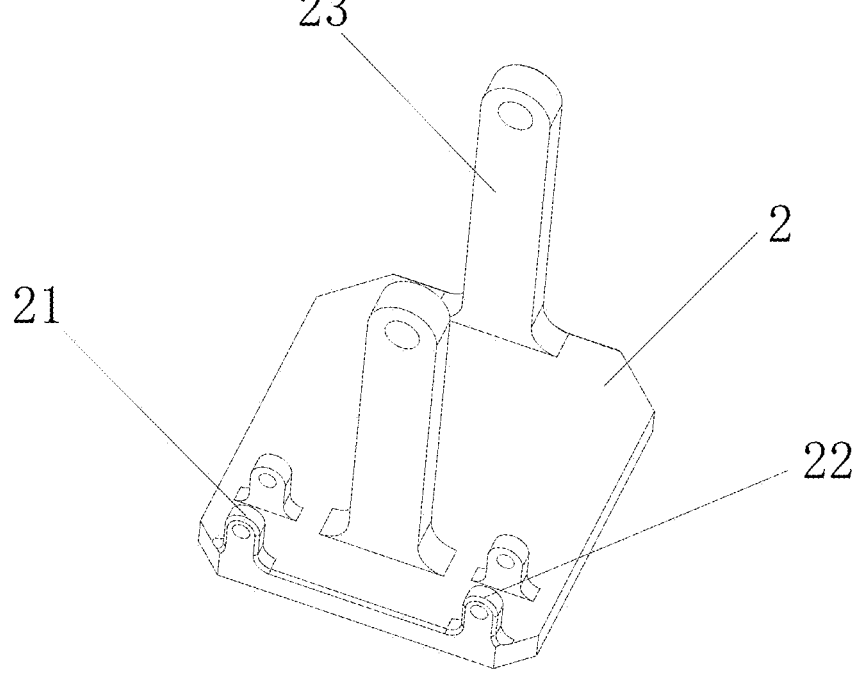
FIG. 5 is a structural schematic diagram of the supporting component in one embodiment.

Furthermore, referring to FIG. 5, the first lower transmission shaft seat 21 and the second lower transmission shaft seat 22 are positioned on the left and right sides of the supporting component 2, respectively. The supporting component 2 also incorporates a supporting hinge seat 23, centrally located between the first lower transmission shaft seat 21 and the second lower transmission shaft seat 22. The shock absorption mechanism introduces a movable axle 5, securely clamped between the first connecting arm 12 and the second connecting arm 13. The first shaft portion of the movable axle 5 is rotationally connected to the supporting hinge seat 23, while the second shaft portion of the movable axle 5 is linked to the left end of the first rotating part 3111 and the right end of the second rotating part 3211. In this embodiment, the first connecting arm 12 and the second connecting arm 13 are linked to the supporting component 2 through the movable axle 5, allowing the supporting component 2 to move relative to the first connecting arm 12 and the second connecting arm 13 under the influence of the first rotating part 3111 and the second rotating part 3211, thereby achieving effective buffering and damping. Additionally, the placement of the movable axle 5 above the supporting component 2 minimizes the impact of tension and thrust generated during the movement of the connector 1 on the supporting component 2. This design consideration ensures structural stability and eliminates interference during the movement or rotation of the connector 1.

Furthermore, the outer side of the end portion of the first connecting arm 12 and the second connecting arm 13 is furnished with installation grooves 14, precisely tailored to accommodate and constrain the first rotating part 3111 and the second rotating part 3211.

Additionally, the movable axle 5, the first lower transmission shaft 3123, and the second lower transmission shaft 3223 all utilize a cross-axis shaft. This type of shaft incorporates mutually perpendicular first and second axes, imparting front-back as well as left-right rotation functions, thereby achieving flexible transmission functions within the structure.

Figure 6:
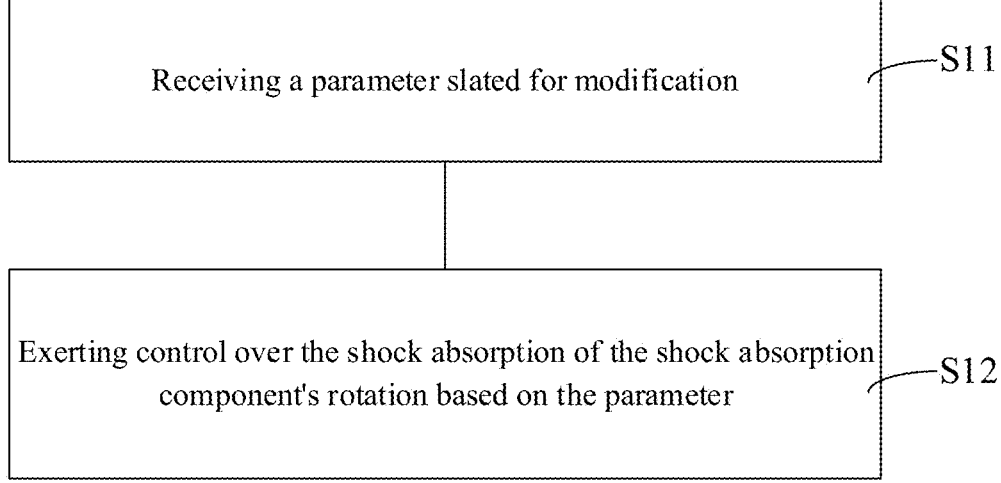
FIG. 6 is a flowchart of a shock absorption regulating method according to one embodiment of the present disclosure.

This embodiment also introduces a shock absorption regulating method for the described shock absorption mechanism, as illustrated in FIG. 6, including the following steps:

Receiving parameters slated for modification; for example, the parameters utilized in this method can include a predetermined voltage.

Exerting control over the shock absorption of the shock absorption component's rotation based on the received parameters.

It is understood that the shock absorption component primarily employs a brushless motor for shock absorption or damping. The brushless motor rotates through the magnetic interaction between the fixed component's coil and the rotating component's magnet. Adjusting the voltage alters the magnetic force between the coil and the magnet. For instance, increasing the voltage enhances the magnetic force between the coil and the magnet. Therefore, in this application, shock absorption between the fixed component and the rotating component can be fine-tuned by adjusting the voltage, accommodating various motor loads.

This embodiment also introduces a shock absorption regulating method for the described shock absorption mechanism, as presented in FIG. 7, including the subsequent steps:

A microcontroller receives an angular velocity of the supporting component's motion (e.g., swaying). It is understood that as the supporting component is linked to the shock absorption component described above, and any swaying of the supporting component due to the camera load influences the overall swaying of the shock absorption mechanism. The microcontroller gathers the angular velocity data through the magnetic encoders, calculates based on this data, and then controls the shock absorption component to rotate according to the calculated result.

The microcontroller directs the shock absorption component to rotate based on the angular velocity to mitigate the swaying or rotation of the supporting component.

For example, the microcontroller calculates the torque corresponding to the angular velocity and instructs the shock absorption component 3 to generate the corresponding rotational torque for rotation.

Furthermore, the PID algorithm is employed to calculate the voltage value. The microcontroller regularly queries the data from the first magnetic encoder 3113 and the second magnetic encoder 3213 to obtain the angular velocity of the supporting component 2. The microcontroller computes the desired voltage through the PID algorithm and regulates the shock absorption component 3 accordingly to generate the necessary torque for counterbalancing and buffering the swaying of the supporting component 2, thereby ensuring the stability of the camera during shooting. It is understood that in this embodiment, the microcontroller can periodically poll the data from the first magnetic encoder 3113 and the second magnetic encoder 3213 at predefined intervals, such as every 10 seconds.

Furthermore, in this application, the rotating component operates on the principles of a brushless motor. Voltage can serve as a parameter, and through meticulous adjustment of the voltage, the magnetic force between the coil and the magnet undergoes modulation. This deliberate modulation effectuates shock absorption adjustments within the shock absorption mechanism, mitigating the camera's shake in a real-time manner. In operational terms, the encoder is mounted on the rotating component. When the camera sways, causing the supporting component to shift, the supporting component propels the rotating component in a corresponding direction. At this juncture, the encoder detects the angular velocity of the swaying and transmits this information to the microcontroller. The microcontroller, employing a PID algorithm, computes the voltage corresponding to the torque generated by the motor, subsequently directing the coil to generate the requisite torque based on this voltage. This orchestrated action mitigates the camera shake.

The foregoing represents only an exemplary embodiment of the present disclosure and is not intended to restrict its scope. Any modifications, equivalent replacements, and enhancements made within the spirit and principles of the present disclosure should be encompassed within the protective scope of the present disclosure.

What is claimed is:

1. A shock-absorption mechanism, comprising:
a connector;
a supporting component movably connected to the connector; and
a shock absorption component, with a first end rotationally connected to the connector and a second end movably connected to the supporting component for facilitating movement of the supporting component, wherein the shock absorption component comprises:
an encoder configured to detect an angular velocity characterizing an oscillation of the supporting component; and
a motor configured to regulate a rotation of the shock absorption component based on a torque corresponding to the angular velocity so as to buffer shaking of the supporting component.

2. The shock-absorption mechanism according to claim 1, wherein the shock absorption component comprises a plurality of shock absorption components, and wherein the connector comprises a connecting body, the connecting body comprises a plurality of connecting arms, and the plurality of connecting arms are individually and movably connected to a corresponding one of the plurality of shock absorption components.

3. The shock-absorption mechanism according to claim 2, further comprising:
a movable axle positioned between two connecting arms of the plurality of connecting arms; and
the movable axle establishes rotational connections with the two connecting arms and is movably linked to the supporting component.

4. The shock-absorption mechanism according to claim 3, wherein the shock absorption component comprises a shock absorption member and a transmission member;
the shock absorption member movably connected to a connecting arm of the plurality of connecting arms, and the shock absorption member drivably connect to the transmission member; and
an end of the transmission member away from the shock absorption member being movably connected to the supporting component, which transmits the movement of the shock absorption member to the supporting component.

5. The shock-absorption mechanism according to claim 4, wherein the shock absorption member comprises a rotating part and a fixed part;
the fixed part being connected to a connecting arm of the plurality of connecting arms, and the fixed part being movably connected to the rotating part, which is drivably connected relative to the connecting arm; and
the rotating part being movably connected to the transmission member, propelling the motion of the transmission member as the rotating part rotates.

6. The shock-absorption mechanism according to claim 4, wherein the shock absorption mechanism further encompasses a plurality of transmission shafts; and
two of the plurality of transmission shafts are individually and movably connected to two ends of the transmission member, and the two of the plurality of transmission shafts are movably connected to both the shock absorption member and the supporting component.

7. The shock-absorption mechanism according to claim 4, wherein:
the shock absorption member comprises a first transmission shaft seat at an outer periphery of the shock absorption member;
the supporting component comprises a second transmission shaft seat; and
two ends of the transmission member are respectively connected to the first transmission shaft seat and the second transmission shaft seat.

8. The shock-absorption mechanism according to claim 7, wherein the supporting component further comprises a supporting hinge seat, the supporting hinge seat movably connected to the connecting arm, thereby establishing an articulated connection between the connecting arm and the supporting component;
the second transmission shaft seat comprises two second transmission shaft seats respectively situated at two ends of the supporting component; and
the supporting hinge seat is positioned along a midpoint between the two second transmission shaft seats, establishing an articulated connection with the connecting arm.

9. A method for shock absorption control, applicable to the shock-absorption mechanism according to claim 1, comprising:
receiving a parameter slated for modification; and
exerting control over shock absorption of a rotation of the shock absorption component based on the parameter.

* * * * *